United States Patent [19]

Rinehart

[11] 4,156,755
[45] May 29, 1979

[54] LITHIUM CONTAINING ION EXCHANGE STRENGTHENED GLASS

[75] Inventor: Dale W. Rinehart, Natrona Heights, Pa.

[73] Assignee: PPG Industries, Inc., Pittsburgh, Pa.

[21] Appl. No.: 897,839

[22] Filed: Apr. 19, 1978

[51] Int. Cl.$^2$ .................. C03C 3/04; C03C 21/00
[52] U.S. Cl. .................. 428/410; 106/52; 65/30 E; 428/428
[58] Field of Search .................. 106/52; 65/30 E; 428/410, 428

[56] References Cited

U.S. PATENT DOCUMENTS

| | | | |
|---|---|---|---|
| 3,218,220 | 11/1965 | Weber | 106/52 |
| 3,357,876 | 12/1967 | Rinehart | 65/30 E |
| 3,433,611 | 3/1969 | Saunders et al. | 106/52 |
| 3,485,702 | 12/1969 | Mochel | 106/52 |
| 3,529,946 | 9/1970 | Fischer et al. | 65/30 E |
| 3,533,888 | 10/1970 | Eppler et al. | 428/410 |
| 3,615,320 | 10/1971 | Junge | 65/30 E |
| 3,752,729 | 8/1973 | Mochel | 106/52 |
| 3,790,430 | 2/1974 | Mochel | 106/52 |
| 3,985,535 | 10/1976 | Bennett et al. | 428/410 |
| 4,015,045 | 3/1977 | Rinehart | 65/30 E |

*Primary Examiner*—O. R. Vertiz
*Assistant Examiner*—Mark Bell
*Attorney, Agent, or Firm*—Dennis G. Millman

[57] ABSTRACT

Glasses having 59–62% by weight $SiO_2$, 10–12% $Na_2O$, 4–5.5% $Li_2O$, 15–23% $Al_2O_3$, and 2–5% $ZrO_2$ have been found to be excellent for ion exchange strengthening below the strain point by exchanging the lithium ions with larger alkali metal ions such as sodium. Such glasses possess low melting temperatures, wide working ranges, and good chemical durability. The glasses are also free from corrosive volatile components, and sheets of such glasses resist devitrification when subjected to subsequent bending processes.

7 Claims, No Drawings

LITHIUM CONTAINING ION EXCHANGE STRENGTHENED GLASS

BACKGROUND OF THE INVENTION

This invention relates to glass compositions which are capable of being ion exchange strengthened at temperatures below the strain point, the use of such glasses in chemical strengthening processes, and the chemically strengthened glass articles produced thereby. In particular, the invention deals with chemically strengthenable glasses containing lithium in which strengthening is carried out by replacing lithium ions in the glass with larger alkali metal ions, such as sodium, from an external source, typically a molten inorganic salt bath.

The basis for below-the-strain-point ion exchange strengthening techniques is U.S. Pat. No. 3,218,220 to Weber. Subsequently, many attempts have been made to produce glass compositions with enhanced ion exchange properties, chief among which are the $Al_2O_3$ and/or $ZrO_2$ containing glasses disclosed by Mochel in U.S. Pat. Nos. 3,485,702, 3,752,729, and 3,790,430. Such modified glass compositions yield greatly enhanced rates of ion exchange, but usually have relatively high melting and forming temperatures.

A lithium-alumino-silicate glass composition of the same general type as the present invention, and in which the melting and forming temperatures are advantageously similar to that of conventional soda-lime-silica flat glass, is disclosed in U.S. Pat. No. 3,615,320 to Junge et al. Despite the advantageous combination of properties of the glass compositions disclosed in said U.S. Pat. No. 3,615,320, its compositions suffer a serious drawback in their reliance on a substantial inclusion of $B_2O_3$. Because of its volatility and corrosiveness to refractory furnace materials, the $B_2O_3$ content of such glasses has been found to render melting difficult in conventional flat glass melting furnaces. Thus, it would be highly desirable if a glass were available exhibiting the desirable combination of properties possessed by the glasses of U.S. Pat. No. 3,615,320 but without the troublesome $B_2O_3$ content.

In addition to relatively low melting and forming temperatures, rapid ion exchange rates, and chemical durability, it is also desirable for a glass composition of this type to be free from devitrification problems. Thus, the glass should have a working range (the difference between the forming temperature and the liquidus temperature) of at least 50° F. Furthermore, undesirable surface devitrification of glass sheets made in accordance with the aforementioned U.S. Pat. No. 3,615,320 has been observed when the glass sheets are heated to temperatures required for bending the glass sheets to sharp bends. The resultant reduction in transparency renders the sharply bent sheets unsuitable for some intended uses such as aircraft glazing. Thus, it would also be desirable to eliminate such a tendency of the glass to devitrify at the surface when bending.

U.S. Pat. Nos. 3,357,876 to Rinehart, 3,433,611 to Saunders et al., and 3,529,946 to Fischer et al. may also be of interest to the present invention for their disclosure of ion exchange glasses containing lithium, alumina, and zirconia. The first two, however, require the inclusion of $P_2O_5$, and ingredient which, like $B_2O_3$, is volatile. The last mentioned patent discloses only broad, general ranges without suggesting the specific composition of the present invention.

SUMMARY OF THE INVENTION

It has now been discovered that ion exchange glasses consisting essentially of silica, soda, lithia, alumina, and zirconia in specific concentration ranges have the desirable combination of low melting temperature (less than about 2,850° F.), wide working ranges (at least 50° F.), the ability to attain high strength and deep compression layers with reasonably short ion exchange treatment times, good durability, and resistance to devitrification after reheating. The glass compositions of the invention are as follows (in percent by weight on the oxide basis):

| Component | Range | Preferred Range |
|---|---|---|
| $SiO_2$ | 59–63% | 60–63% |
| $Na_2O$ | 10–13% | 10–12% |
| $Li_2O$ | 4–5.5% | 4–5.5% |
| $Al_2O_3$ | 15–23% | 17–19% |
| $ZrO_2$ | 2–5% | 3.5–5% |
| ($Al_2O_3 + ZrO_2$) | 19–25% | 21.5–24% |

Minor quantities (up to about 5% by weight total) of other glass forming materials and glass modifiers may be included, such as MgO, MnO, $TiO_2$, $Sb_2O_3$, $As_2O_3$, $K_2O$, PbO, colorants, and mixtures thereof.

DETAILED DESCRIPTION

In the glasses of the present invention, $SiO_2$ is the primary glass former and is the largest single component of these glasses, being present in the range of 59–63% by weight. Minimizing the $SiO_2$ content is desirable so as to lower the melting temperature, but too little $SiO_2$ can adversely effect the durability of the glass. $Na_2O$ is present as a fluxing agent, and thus at least the minimum amount prescribed should be present in the glass to maintain the melting temperature of the glass at a practical level. However, an excess of $Na_2O$ can reduce the resistance of the glass to chemical attack. Applicant has now discovered that the narrowly defined range of 10–13% $Na_2O$ is apparently an important factor in enabling $ZrO_2$ to be included in this type of glass without creating devitrification problems. $Li_2O$ also acts as a flux to aid melting and provides lithium ions which serve as the sites for subsequent ion exchange. $Li_2O$ should be present in the amount of 4–5.5%. The glass should include at least 15% $Al_2O_3$ to provide adequate compression layer depth and strength as a result of the ion exchange strengthening process, but should not contain more than 23% since $Al_2O_3$ tends to increase the melting temperature and lessen chemical durability.

A major difference between the present invention and the glasses of U.S. Pat. No. 3,615,320 is the inclusion here of 2–5% $ZrO_2$ in place of $B_2O_3$. $ZrO_2$ tends to lower the melting temperature of the glass, enhance its ion exchange properties, and improve the durability of the glass. Because of its beneficial lowering of the melting temperature, $ZrO_2$ would appear to be an ideal substitute for $B_2O_3$, but the inclusion of $ZrO_2$ can increase the liquidus temperature of the glass, thereby reducing the working range and even producing negative working ranges. An important aspect of the present invention is the discovery that in the 2–5% range of $ZrO_2$ concentration, the benefits of $ZrO_2$ may be obtained without the adverse effects on the liquidus temperature by carefully adjusting the concentrations of the other components of the glass, in particular, the concentration of Na$_2$O. However, even with these precautions, it is not advisable to exceed 5% ZrO$_2$ in the glasses of the present invention in order to maintain an adequate working range (at least about 50° F. for most applications). In order to maintain a balance between working range and durability, it is preferred that the concentrations of ZrO$_2$ and Na$_2$O increase or decrease together roughly in accordance with a ratio of Na$_2$O to ZrO$_2$ between about 2.2 and 5.5. On the other hand, the sum of the Al$_2$O$_3$ and ZrO$_2$ concentrations should be at least about 19%, preferably at least 21.5%. Preferably, the glass includes no purposeful addition of B$_2$O$_3$. Likewise, other volatile components, such as P$_2$O$_5$ and ZnO, are preferably avoided. However, minor amounts, up to about 5% by weight total, of other glass forming materials and glass modifiers may be included in the glass composition of this invention, such as MgO, MnO, TiO$_2$, Sb$_2$O$_3$, As$_2$O$_3$, K$_2$O, PbO, and the like. Preferably, none of these optional glass modifiers exceeds about 2% by weight. Minor amounts of colorants, such as Fe$_2$O$_3$, may be included in the glass.

The glasses of the examples in Table I were melted in an electric furnace at 1450° to 1475° C. in 4 inch diameter platinum crucibles from batch materials calculated to yield 750 grams of the oxide composition. For example, the batch composition of the glass of Example 10 was as follows:

"Supersil" sand (SiO$_2$) — 449.5 grams
Reagent grade Na$_2$CO$_3$ — 141.1 grams
Reagent grade Li$_2$CO$_3$ — 92.6 grams
Reagent grade Al(OH)$_3$ — 210.4 grams
Zircon sand (ZrSiO$_4$) — 45.2 grams The batch ingredients were added incrementally over a period of about 3 hours while being stirred. Each melt was stirred for an additional period of about 16 hours. Thereafter, each melt was held in the furnace without stirring for one more hour to refine the glass, after which a number of rods were drawn from each melt and the remainder of each melt was cast onto an iron plate and rolled to 3/16 inch thickness. The rods and cast plates were then annealed.

Melting temperature for the purposes of this application is taken as the temperature at which a glass has a viscosity of 100 poises. Since commercial flat glass made by the float process or the sheet updraw process usually exhibits a viscosity of 100 poises at a temperature below about 2,850° F. (1566° C.), that temperature is considered herein as being the upper limit for a desirable melting temperature. Forming temperature is defined as the temperature at which the glass exhibits a viscosity of 10,000 poises. Both melting temperature and forming temperature in the examples of Table I were determined by a standard rotating spindle viscometer technique. Liquidus temperatures were determined by placing pieces of the glass sample into an elongated refractory boat which was then placed into a gradient furnace. There the glass was melted and held for a period of time at elevated temperature, after which the glass was examined for the presence of crystal growth along the length of the melted sample. Annealing points were determined from differential thermal analysis traces of the glasses calibrated against similar traces of standard glasses with known annealing points.

Compression layer depths after ion exchange were measured for the examples by sawing and grinding a cross-sectional slice from a piece of an ion exchanged sample, and the slice was then observed under a microscope with cross-polaroids. Compression layer depth is an important factor in determining the effective strength of a treated glass article in actual use. An ion-exchanged glass article having a very high initial strength will not retain its strength when subjected to abrasion, scratching, and other wear in use if its generated compressive stress is concentrated in a very thin surface layer of the glass. Thus, the compression layer should extend deep enough into the surface of the glass to withstand the normal physical abuses to which it may be subjected. The minimum compression layer depth required will depent upon the particular end use of the glass, but theoretically the compression layer need extend only beyond the deepest penetration of typical surface defects in order to retain at least some of its enhanced strength. This has been estimated to be about five microns in the case of a glass plate subjected to reasonably careful handling.

The strength of some of the examples after ion exchange strengthening is reported in terms of modulus of rupture (M.O.R.) measured by two different techniques. A first technique is the abraded rod technique in which rods nominally three millimeters in diameter and 2.5 inches (6.5 centimeters) in length were ion exchanged in a molten bath of NaNO$_3$ for 22 hours at 705° F. After ion exchange treatment, the rods were subjected to tumble abrasion in a 16 ounce jar containing 240 grit silicon carbide. The jar was rotated horizontally about its main axis at a speed of about 167 revolutions per minute for 30 minutes. Each abraded rod was then placed singly on a 1.5 inch (3.8 centimeter) support span and stressed to fracture with a ¾ inch (1.9 centimeter) wide load member. The load at fracture is recorded, and M.O.R. is calculated by the following formula:

$$M.O.R. = (8WL/\pi ab^2)$$

where W is the load at fracture, L is the difference between the load and support spans, "a" is the larger diameter of the rod, and "b" is the smaller diameter of the rod (assuming that the rod is not perfectly circular in cross section). Each reported M.O.R. value represents the average of at least 10 rods.

The second technique for measuring M.O.R. employs 2 inch by 2 inch square plates about 1/10-⅛ inch thick. The glass squares were first ion exchange strengthened in molten NaNO$_3$ for 4 hours at 750° F. The plates were subsequently abraided by the free fall of 10 cubic centimeters of 25–30 grit silicon carbide from a height of 12 inches onto a ½ inch diameter circular area located in the center of the test square. The abraided plates were then fractured by concentric ring loading, the diameter of the support and load rings being 1.5 and 0.75 inches respectively. The load at fracture is recorded and M.O.R. is calculated as the computer solution of the following expression:

$$W = 2.160 \, (M.O.R.) \, h^2 + 2.325 \times 10^{-15} \, (M.O.R.)^3/h^2$$

where W is the load at fracture and h is the glass thickness.

The reported weight loss in acid is a measurement of the surface attack suffered by a two inch by two inch ground and polished unexchanged specimen as a result of a 30 minute immersion in boiling 0.5 weight percent aqueous H$_2$SO$_4$ solution. The greater the weight loss, the poorer is the glass's durability against chemical attack in an acid environment. The weight loss of 0.006 milligrams per square centimeter of Example 1 (the prior art glass) may be considered a standard for good chemical durability for a glass of this type.

Center tension was measured by the conventional graduated quartz wedge technique and is expressed as millimicrons retardation per inch of optical path through the chemically strengthened glass. Center tension is a measure of the stresses created in the interior of the glass in counteraction to the compression stresses in the surface portions, and is directly related to the ability of the treated glass to fragment into small particles upon fracture.

The examples of Table I illustrate the difficulty of attaining the objectives of the present invention. Example 1 is a composition approximating the preferred practice of U.S. Pat. No. 3,615,320 and which contains $B_2O_3$. Although it is desired to avoid the inclusion of $B_2O_3$, the properties of the Example 1 glass are otherwise generally satisfactory except for the indicated occurrence of devitrification after being held at 1150° F. Also, although its melting temperature is acceptable, a lower melting temperature would be preferred. In Example 2, the substitution of $ZrO_2$ for silica lowered the melting temperature and eliminated the devitrification problem at 1150° F., but produced a negative working range and increased the susceptibility of the glass to acid attack. The composition of Example 3, only slightly modified from that of Example 2, likewise produced an undesirably high liquidus and reduced acid durability. In Example 4, substituting $ZrO_2$ for both $SiO_2$ and $Al_2O_3$ restored resistance to acid attack but did not avoid a negative working range. In Example 5, substituting $ZrO_2$ for only $Al_2O_3$ yielded a glass with excellent resistance to acid attack and improved the working range, but not to the extent desired for commercial production. Example 6 shows replacement of $B_2O_3$ with MgO instead of $ZrO_2$, and the liquidus was again too high to permit a reasonable working range. Substituting MgO together with $ZrO_2$ for $B_2O_3$ as in Example 7 lowered the melting temperature significantly, but did not improve the working range problem and lowered the chemical durability of the glass. Examples 8, 9, 10, and 11 are variations of the glass of Example 7 but none exhibited a favorable liquidus temperature. In Example 12, elimination of $B_2O_3$ was compensated for by adding a relatively large amount of $ZrO_2$ and increasing the soda content of the glass without including MgO. The result was a glass having a satisfactory melting temperature but with an inadequate working range. Example 13 differed from Example 12 by lowering the $ZrO_2$ content in exchange for a higher $Al_2O_3$ content, but the glass again exhibited an inadequate working range.

Examples 16, 17, and 18, on the other hand, show quite unexpectedly a narrow compositional range in which good working ranges were obtained. At the same time, Examples 16, 17, and 18 yielded glasses having melting temperatures about the same as, or lower then, the glass of Example 1, with acid durability at least as good as Example 1, none of the devitrification at 1150° F. associated with Example 1, and M.O.R. strengths after ion exchange comparable to that of Example 1. Yet, Examples 16, 17, and 18 are free from the troublesome $B_2O_3$ component thought to be necessary in the prior art. Example 18, with its suprisingly large working range, would appear to be the most preferred embodiment, but in some cases the relatively low melting temperature of Example 16 may render that composition more desirable.

The ion exchange strengthening treatment for which the glasses of the present invention are intended is well known in the art and need not be elaborated upon in great length here. The usual method of treating the glass articles is to immerse the glass into a bath of molten inorganic salt containing an alkali metal ion larger than lithium at a temperature between the melting point of the salt and the strain point of the glass. The larger alkali metal ion is preferably sodium, although potassium, and theoretically rubidium or cesium, could also be used. Alkali metal nitrates are the most commonly employed salts, although other salts such as chlorides, fluorides, phosphates, or mixtures thereof may be employed. Usually the glass articles are preheated prior to the immersion in the molten salt bath in order to avoid thermal shock. It is usually preferred that the highest salt bath temperature possible be used in order to shorten treatment time, but in other cases it may be desirable to ion exchange more slowly to obtain greater strength. Although it is said in general that the temperature should be maintained below the strain point of the glass, it should be understood that brief deviations above the strain point can be tolerated so long as the glass does not remain above the strain point for a sufficient time to cause appreciable thermal relaxation of the induced compression at the surface of the glass. Other methods of contacting the glass with the ion exchange medium include spraying the glass with a source of alkali metal ions or coating the glass with a thickened carrier mixed with the alkali metal ions.

Other modifications and variations as are known in the art may be resorted to without departing from the spirit and scope of the invention as defined by the appended claims.

TABLE I

| Example No.: | 1 | 2 | 3 | 4 | 5 | 6 | 7 | 8 | 9 |
|---|---|---|---|---|---|---|---|---|---|
| Composition (wt. %) | | | | | | | | | |
| $SiO_2$ | 62.1 | 58.1 | 57.8 | 60.1 | 62.1 | 62.1 | 60.1 | 57.4 | 60.9 |
| $Na_2O$ | 8.2 | 8.2 | 9.5 | 8.2 | 8.2 | 8.2 | 8.2 | 11.0 | 10.0 |
| $Li_2O$ | 5.3 | 5.3 | 4.3 | 5.3 | 5.3 | 5.3 | 5.3 | 5.0 | 5.0 |
| $B_2O_3$ | 4.8 | 4.8 | 4.8 | 4.8 | 4.8 | — | — | — | — |
| $Al_2O_3$ | 19.6 | 19.6 | 19.6 | 17.6 | 15.6 | 19.6 | 17.6 | 18.1 | 18.1 |
| $ZrO_2$ | — | 4.0 | 4.0 | 4.0 | 4.0 | — | 4.0 | 4.0 | 4.0 |
| MgO | — | — | — | — | — | 4.8 | 4.8 | 4.5 | 2.0 |
| Melting temp., °F. | 2825 | 2742 | — | 2746 | 2743 | — | 2657 | — | — |
| Forming temp., °F. | 1907 | 1935 | — | 1903 | 1894 | — | — | — | — |
| Liquidus temp., °F. | 1820 | >1990 | >1962 | >1970 | 1870 | >1960 | >1940 | >1940 | >1970 |
| Working range, °F. | 87 | — | — | — | 24 | — | — | — | — |
| Anneal point, °F. | 903 | 959 | — | 954 | 939 | — | 1008 | — | — |
| Compression layer, mils | 6.7 | 7.2 | — | 6.9 | — | — | 6.3 | — | — |
| Wt. loss in acid, mg/cm² | 0.006 | 0.0038 | 0.030 | 0.003 | 0.001 | — | 0.012 | — | — |
| Center tension, | | | | | | | | | |

TABLE I-continued

|  | | | | | | | | | |
|---|---|---|---|---|---|---|---|---|---|
| millimicron/inch | 1530 | 2075 | 1795 | 1800 | 1670 | — | 1725 | — | 1575 |
| Devitrification after 1 hr. at 1150° F. | Yes | None | — | None | None | — | — | — | — |
| M.O.R., rod, psi | 43,300 | — | — | — | — | — | — | — | — |
| M.O.R., plate, psi | 44,500 | — | — | — | — | — | — | — | — |

| Example No.: | 10 | 11 | 12 | 13 | 14 | 15 | 16 | 17 | 18 |
|---|---|---|---|---|---|---|---|---|---|
| Composition (wt. %) | | | | | | | | | |
| SiO$_2$ | 59.9 | 60.1 | 59.9 | 59.9 | 59.7 | 60.0 | 60.4 | 61.0 | 61.9 |
| Na$_2$O | 11.0 | 8.2 | 11.0 | 11.0 | 11.0 | 10.7 | 11.5 | 10.7 | 11.0 |
| Li$_2$O | 5.0 | 5.3 | 5.0 | 5.0 | 5.2 | 5.2 | 5.0 | 5.2 | 5.0 |
| B$_2$O$_3$ | — | — | — | — | — | — | — | — | — |
| Al$_2$O$_3$ | 18.1 | 15.6 | 18.1 | 19.1 | 20.1 | 19.6 | 18.1 | 18.6 | 18.1 |
| ZrO$_2$ | 4.0 | 4.0 | 6.0 | 5.0 | 4.0 | 4.5 | 5.0 | 4.5 | 4.0 |
| MgO | 2.0 | 4.8 | — | — | — | — | — | — | — |
| Melting temp., °F. | — | 2658 | 2782 | — | 2816 | 2825 | 2782 | 2805 | 2810 |
| Forming temp., °F. | — | 1907 | 1993 | — | 1972 | 2000 | 1977 | 1990 | 1958 |
| Liquidus temp., °F. | >1980 | >1990 | >1960 | >1970 | No crystals | >1975 | 1900 | 1920 | 1615 |
| Working range, °F. | — | — | — | — | — | — | 77 | 70 | 343 |
| Anneal point, °F. | 941 | 957 | 993 | — | 970 | 963 | 966 | 975 | 950 |
| Compression layer, mils | — | — | — | — | — | — | — | — | 7.4 |
| Wt. loss in acid, mg/cm$^2$ | — | — | — | — | 0.011 0.054 | — | 0.006 | 0.003 | 0.003 |
| Center tension, millimicron/inch | — | — | 1750 | 1745 | — | — | 1530 | 1690 | 1540 |
| Devitrification after 1 hr. at 1150° F. | — | — | — | — | — | — | None | None | None |
| M.O.R., rod, psi | — | — | — | — | — | — | 45,400 | 44,900 | 45,300 |
| M.O.R., plate, psi | — | — | — | — | — | — | 43,200 | 44,200 | 44,400 |

I claim:

1. A glass composition capable of being ion exchange strengthened below its strain point, consisting essentially of, by weight on the oxide basis:
   59 to 63% — SiO$_2$
   10 to 13% — Na$_2$O
   4 to 5.5% — Li$_2$O
   15 to 23% — Al$_2$O$_3$
   2 to 5% — ZrO$_2$
   and 0 to 5% total of non-essential components selected from the group consisting of MgO, MnO, TiO$_2$, Sb$_2$O$_3$, As$_2$O$_3$, K$_2$O, PbO, SO$_3$, colorants, and mixtures thereof; wherein the sum of the weight percentages of Al$_2$O$_3$ and ZrO$_2$ is 19 to 25%, and the ratio of Na$_2$O to ZrO$_2$ is from 2.2 to 5.5.

2. The glass of claim 1 wherein at least 98% by weight of the total composition consists of SiO$_2$, Na$_2$O, Li$_2$O, Al$_2$O$_3$, and ZrO$_2$.

3. The glass of claim 2 wherein the composition consists essentially of, by weight on the oxide basis:
   60 to 63% — SiO$_2$
   10 to 12% — Na$_2$O
   4 to 5.5% — Li$_2$O
   17 to 19% — Al$_2$O$_3$
   3.5 to 5% — ZrO$_2$
   wherein the sum of the weight percentages of Al$_2$O$_3$ and ZrO$_2$ is 21.5 to 24%.

4. An ion exchange strengthened glass article having a surface portion in compression and an interior portion in tension; the interior portion consisting essentially of, by weight on the oxide basis:
   59 to 63% — SiO$_2$
   10 to 13% — Na$_2$O
   4 to 5.5% — Li$_2$O
   15 to 23% — Al$_2$O$_3$
   2 to 5% — ZrO$_2$
   and 0 to b 5% total of non-essential components selected from the group consisting of MgO, MnO, TiO$_2$, Sb$_2$O$_3$, As$_2$O$_3$, K$_2$O, PbO, SO$_3$, colorants, and mixtures thereof; wherein the sum of the weight percentages of Al$_2$O$_3$ and ZrO$_2$ is 19 to 25%, and the weight ratio of Na$_2$O to ZrO$_2$ is from 2.2 to 5.5;
   the surface portion differing from the interior portion in a lower content of Li ions and a greater content of alkali metal ions larger than Li ions.

5. The glass article of claim 4 wherein at least 98% by weight of the total composition of the interior portion of the glass consists of SiO$_2$, Na$_2$O, Li$_2$O, Al$_2$O$_3$, and ZrO$_2$.

6. The glass article of claim 5 wherein the composition of the interior portion of the glass consists essentially of, by weight on the oxide basis:
   60 to 63% — SiO$_2$
   10 to 12% — Na$_2$O
   4 to 5.5 — Li$_2$O
   17 to 19% — Al$_2$O$_3$
   3.5 to 5% — ZrO$_2$
   wherein the sum of the weight percentages of Al$_2$O$_3$ and ZrO$_2$ is 21.5 to 24%.

7. The glass article of claim 4 wherein the alkali metal ions larger than Li ions include Na ions.

* * * * *